US012656210B2

(12) United States Patent
Burnell et al.

(10) Patent No.: US 12,656,210 B2
(45) Date of Patent: Jun. 16, 2026

(54) MONITORING SYSTEM

(71) Applicant: MBDA UK Limited, Stevenage (GB)

(72) Inventors: Gregory Michael Burnell, Stevenage (GB); Matthew Charles Wilshin, Stevenage (GB); Terence Alexander Bentley, Stevenage (GB)

(73) Assignee: MBDA UK Limited, Stevenage (GB)

( * ) Notice: Subject to any disclaimer, the term of this patent is extended or adjusted under 35 U.S.C. 154(b) by 309 days.

(21) Appl. No.: 18/040,540

(22) PCT Filed: Jul. 29, 2021

(86) PCT No.: PCT/GB2021/051961
§ 371 (c)(1),
(2) Date: Feb. 3, 2023

(87) PCT Pub. No.: WO2022/029410
PCT Pub. Date: Feb. 10, 2022

(65) Prior Publication Data
US 2023/0304887 A1 Sep. 28, 2023

(30) Foreign Application Priority Data
Aug. 7, 2020 (GB) ..................................... 2012342

(51) Int. Cl.
*G01M 5/00* (2006.01)
*F41A 31/00* (2006.01)
(52) U.S. Cl.
CPC ........... *G01M 5/0033* (2013.01); *F41A 31/00* (2013.01); *G01M 5/0066* (2013.01)
(58) Field of Classification Search
CPC .... G01M 5/0066; G01M 5/0033; F41A 31/00
See application file for complete search history.

(56) References Cited

U.S. PATENT DOCUMENTS 8,855,943 B1 * 10/2014 Matsui ................ G01M 5/0033
702/41
2006/0140761 A1 * 6/2006 LeMieux ................ F03D 7/042
416/61
(Continued)

FOREIGN PATENT DOCUMENTS

EP 1018641 A1 7/2000
JP 2005-351129 A2 12/2005
(Continued)

OTHER PUBLICATIONS

International Search Report and Written Opinion for Application No. PCT/GB2021/051961 dated Nov. 11, 2021; 10 pgs.
(Continued)

*Primary Examiner* — Lina Cordero
*Assistant Examiner* — Lyudmila Zaykova-Feldman
(74) *Attorney, Agent, or Firm* — Day Pitney LLP; George Chaclas; Anthony A. Kassas

(57) ABSTRACT

Method of and system for monitoring mechanical fatigue of a complex weapon system. First, data representing a movement of the complex weapon system is acquired. On the basis of the acquired data, a measure of mechanical fatigue damage to the complex weapon system arising from the movement is calculated. On the basis of that calculated measure, a cumulative total of the mechanical fatigue damage accrued by the complex weapon system is updated to account for the mechanical fatigue damage arising from the movement.

20 Claims, 4 Drawing Sheets

(56)                    References Cited

U.S. PATENT DOCUMENTS

| | | | |
|---|---|---|---|
| 2007/0068605 A1* | 3/2007 | Statnikov ............... | C21D 10/00 |
| | | | 148/558 |
| 2011/0112775 A1* | 5/2011 | Bramban ............. | G07C 5/0808 |
| | | | 702/56 |
| 2012/0203487 A1* | 8/2012 | Johnson ............... | G01C 25/005 |
| | | | 702/141 |
| 2012/0226409 A1* | 9/2012 | Seize ................... | G07C 5/0841 |
| | | | 701/33.2 |
| 2016/0222946 A1* | 8/2016 | Krings ................... | G01C 21/20 |
| 2018/0121887 A1* | 5/2018 | Pinsonnault ......... | G07C 5/0816 |
| 2019/0033152 A1 | 1/2019 | Mori et al. | |
| 2019/0128770 A1* | 5/2019 | Lapalme ............. | G01M 5/0016 |
| 2019/0369058 A1* | 12/2019 | Fiseni ................ | G01N 29/4427 |
| 2020/0042670 A1* | 2/2020 | Ethington .......... | G05B 23/0283 |
| 2020/0064136 A1* | 2/2020 | Henderson ............. | G01C 21/18 |
| 2020/0339286 A1* | 10/2020 | Al-Ameri ................. | G01L 1/22 |
| 2021/0062764 A1* | 3/2021 | Gullo ........................ | F02K 9/96 |

FOREIGN PATENT DOCUMENTS

| | | |
|---|---|---|
| JP | 2017167082 A | 9/2017 |
| JP | 201860387 A | 4/2018 |
| KR | 1020110107481 | 10/2011 |

OTHER PUBLICATIONS

JP Office Action corresponding to Application No. JP2023-507864, dated Feb. 25, 2025, 6 pages (English translation).
JP Office Action corresponding to Application No. 2023-507864, dated Aug. 19, 2025, 2 pages (English Translation).

* cited by examiner

300

MONITORING SYSTEM

CROSS-REFERENCE TO RELATED APPLICATIONS

The present application is a U.S. National Stage Application of International Application No. PCT/GB2021/051961, filed Jul. 29, 2021 and published on Feb. 10, 2022 as WO2022/029410 A1, which claims benefit and priority of Great Britain Patent Application No. GB2012342.8, filed on Aug. 7, 2020, each of which is incorporated herein by reference in its entirety for any purpose whatsoever.

TECHNICAL FIELD

The present invention concerns mechanical fatigue monitoring. More particularly, but not exclusively, this invention concerns a method and system for monitoring mechanical fatigue of a complex weapon system.

BACKGROUND

When in use, complex weapon systems undergo significant environmental stresses, for example due to extremes of vibration and mechanical shock. These environmental stresses cause the system to mechanically fatigue as it is used. Eventually, the mechanical fatigue can accumulate to such an extent as to cause the system to fail. Complex weapon systems are therefore tested and certified in order to provide assurance that the system is capable of withstanding the mechanical fatigue to which it will exposed throughout its expected lifetime.

Typically, complex weapon systems are certified on the basis of a testing programme simulating accelerated aging of the system. The accelerated aging programme is typically determined based on a required lifetime of the system and an expected usage profile for the system. The usage profile defines an environment to which the system is anticipated to be subjected and may, for example, define vibration levels, temperature variations, typical mechanical shocks, and/or humidity levels. The outcome of this accelerated aging testing is that the system is certified for a defined number of hours of use (for example, a number of hours of air carriage, in the case of an air-launched system). The certification provides a degree of certainty that any particular example instance of the complex weapon system will be able to withstand its intended environment for the duration of its service life. Once an operational system has reached the certified number of hours of use, it has reached the end of its certified life and it is removed from service.

However, this process does not provide means by which to account for the different environments to which individual instances of the complex weapon system are exposed. Depending on the circumstances of the system's deployment, a given number of hours of usage may correspond to a greater or lesser amount of mechanical fatigue compared to other instances of the system deployed in different circumstances. For example, a first instance of an air-launched weapon system deployed to a quick reaction squadron will experience a much higher rate of fatigue than a second instance of an air-launched weapon system deployed for training flights. As a result, when each of those systems reaches their certified number of hours of use, the mechanical fatigue accrued by the system deployed for training flights will likely be significantly less than that accrued by the system deployed to the quick reaction squadron. It can be said that the system deployed for training has had a relatively "easy" life, whilst the system deployed to the quick reaction squadron has had a relatively "hard" life. The processes of the prior art do not distinguish between systems which have had hard or easy lives. In many cases, systems are deployed into circumstances in which the environmental conditions to which they are exposed are significantly milder than the accelerated aging programme with which the system was certified. Thus, systems which have had relatively easy lives may be removed from service sooner than is necessary in view of the actual fatigue damage accrued by that system.

The present invention seeks to mitigate the above-mentioned problems. Alternatively or additionally, the present invention seeks to provide an improved system and method for monitoring mechanical fatigue to a complex weapon system. The present invention may also enable improved means for complex weapon system inventory management.

SUMMARY

The present invention provides, according to a first aspect, a method of monitoring mechanical fatigue of a complex weapon system, the method comprising:

acquiring data representing a movement of the complex weapon system;

on the basis of the acquired data, calculating a measure of mechanical fatigue damage to the complex weapon system arising from the movement;

on the basis of the calculated measure, updating a cumulative total of the mechanical fatigue damage accrued by the complex weapon system to account for the mechanical fatigue damage arising from the movement.

The method of the present invention provides a means to quantify and monitor mechanical degradation of a complex weapon system. By recording data representing movements of a complex weapon system over a period of time, it is possible to determine a measure of the fatigue damage to the complex weapon system as a result of those movements.

Previously, the service life of a complex weapon system has often been defined in terms of a simple number of years in-service or a total length of time deployed in a given service environment (for example, a number of air carriage hours). However, such a definition fails to account for differences in the environments to which individual complex weapon systems are exposed. In the method of the present invention movements of an individual complex weapon system are processed to determine a measure of the fatigue damage to the complex weapon system arising from those movements. The method of the present invention thereby provides an alternative means for defining the service life of a complex weapon system and for monitoring the progression of deployed instances of that complex weapon system through their service lives.

By using the method of the present invention during certification of the complex weapon system (a process which typically involves some kind of accelerated aging programme), it is possible to define the service life of the complex weapon system in terms of a measure of total mechanical fatigue damage based on an actual measured environment, rather than simply the theoretical perceived time in a given service environment.

By calculating and updating that same measure over the life of the complex weapon system, it is possible to monitor the progression of the complex weapon system through its service life. Advantageously, that measure will reflect the harshness of an individual complex weapon system's life.

Thus, compared with prior art methods, by using the method of the present invention, an operator of a complex weapon system can more directly monitor the accrual of mechanical fatigue damage by that complex weapon system. For example, a complex weapon system which is operated in a relatively benign environment will accumulate mechanical fatigue damage at a slower rate, and the cumulative total of the present invention will reflect that. As a result, that complex weapon system will progress through its certified service life at a correspondingly slower rate, and need not be removed from service until it reaches its certified limits of mechanical fatigue. By contrast, the methods and systems of the prior art would be unable to compensate for the benign environment into which that complex weapon system was deployed, and as a result would likely result in premature removal of that system from service.

According to a second aspect of the invention there is also provided a computer program comprising a set of instructions which, when executed by a computerised device, cause the computerised device to perform the method of monitoring mechanical fatigue of a complex weapon system, the method comprising:

acquiring data representing a movement of the complex weapon system;

on the basis of the acquired data, calculating a measure of mechanical fatigue damage to the complex weapon system arising from the movement;

on the basis of the calculated measure, updating a cumulative total of the mechanical fatigue damage accrued by the complex weapon system to account for the mechanical fatigue damage arising from the movement.

According to a third aspect of the invention there is also provided a system for monitoring fatigue damage to a complex weapon system, the system comprising:

a data acquisition module, configured to acquire data representing a movement of the complex weapon system; and a fatigue damage monitor; configured to calculate, on the basis of the acquired data, a measure of mechanical fatigue damage to the complex weapon system arising from the movement and to update, on the basis of the calculated measure, a cumulative total of the mechanical fatigue damage accrued by the complex weapon system to account for the mechanical fatigue damage arising from the movement.

According to a fourth aspect of the invention there is also provided a complex weapon system comprising a system according to the third aspect.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
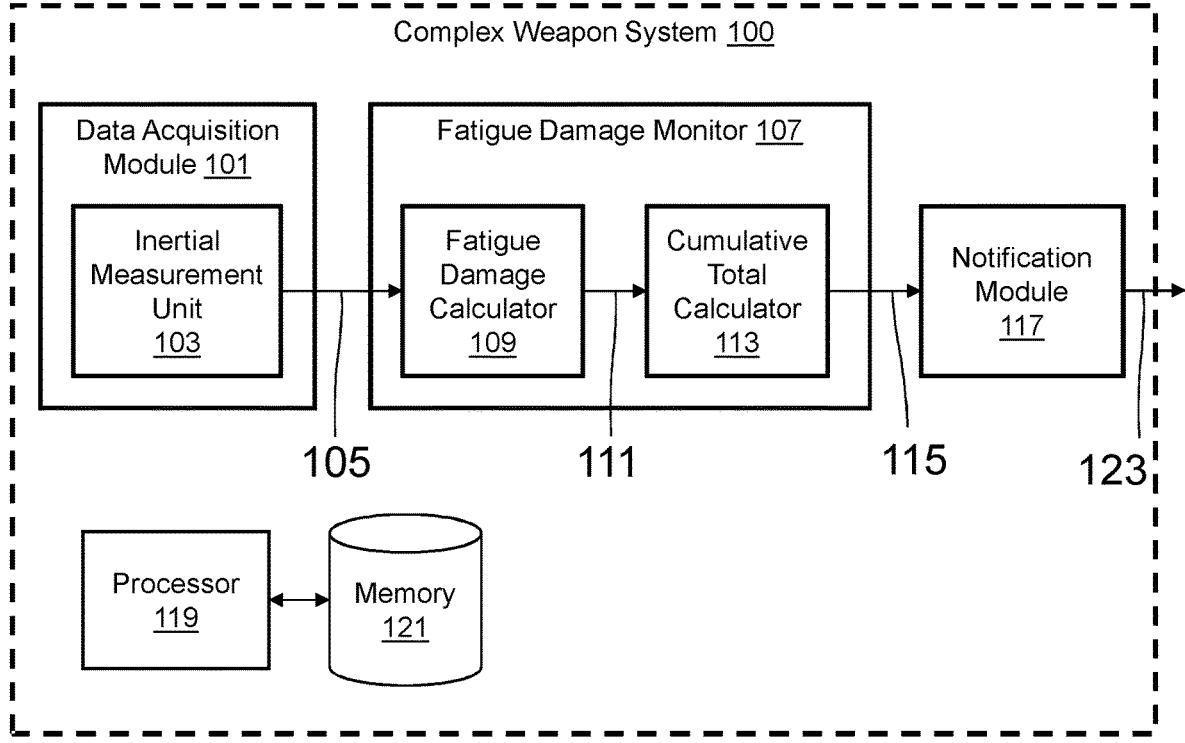
FIG. 1 shows a functional block diagram of a complex weapon system according to a first embodiment of the invention.

The first aspect of the present invention provides a method of monitoring mechanical fatigue of a complex weapon system. The method comprises acquiring data representing a movement of the complex weapon system. The method further comprises calculating, on the basis of the acquired data, a measure of mechanical fatigue damage to the complex weapon system arising from the movement. The method further comprises updating, based on the calculated measure, a cumulative total of the mechanical fatigue damage accrued by the complex weapon system to account for the mechanical fatigue damage arising from the movement.

It will be appreciated by the skilled person that a complex weapon system refers to a guided weapon (for example, a missile) and an associated launcher for that weapon. It will also be appreciated that the complex weapon system may comprise an air-carried, ship-launched, land vehicle launched, or man-portable complex weapon system.

It will also be understood that the method of the present invention may be used to monitor mechanical fatigue of the entirety of the complex weapon system (for example, both a launcher and an attached missile) or of a part of the complex weapon system (for example, only the missile or a subsystem thereof). Thus, the method may be used to monitor mechanical fatigue to any of: a missile, a launcher, a missile subsystem, a launcher subsystem, and a missile container.

It will be understood by the skilled person that mechanical fatigue refers to the weakening of a material due to loading of the material causing localised structural damage within the material. Each occasion of loading of the material causes further mechanical fatigue damage in addition to that already inflicted on the material, such that the mechanical fatigue damage can be said to accumulate over time. Such loading of the complex weapon system is usually a result of a movement of the complex weapon system.

The movement may comprise a mechanical shock to the complex weapon system. It will be understood by the skilled person that a mechanical shock is intended to refer to a relatively large force applied over a relatively short length of time (for example, arising from an impact to the complex weapon system). The movement may comprise a vibration of the complex weapon system. Such a vibration may, for example, arise from air carriage of the complex weapon system. It will be appreciated that different vibrations and mechanical shocks (and the movement more generally) can include differing frequency components, and also that those frequency components may differ in magnitude. Thus, the movement may comprise a combination of one or more vibrations and/or one or more mechanical shocks.

It will be appreciated by the skilled person that a movement of a part of a complex weapon system (but not necessarily the whole of the complex weapon system) constitutes a movement of that complex weapon system. Thus, the method may comprise acquiring data representing a movement of the whole of the complex weapon system or a part thereof. Similarly, the method may comprise calculating, on the basis of the acquired data, a measure of mechanical fatigue damage to the whole of the complex weapon system (or the part thereof) arising from the movement. Likewise, the method may comprise updating, based on the calculated measure, a cumulative total of the mechanical fatigue damage accrued by the whole of the complex weapon system (or the part thereof) to account for the mechanical fatigue damage arising from the movement.

Acquiring data may comprise measuring a movement of the complex weapon system. Measuring a movement of the complex weapon system may comprise operating an accelerometer (for example, forming part of an inertial measurement unit) to determine an acceleration of the complex weapon system. Thus, the data may comprise a series of time samples of an acceleration of the complex weapon system. It may be that the series of time samples corresponds to a sampling rate of greater than 1 kHz, preferably greater than 2.5 kHz, more preferably greater than 5 kHz. It will be appreciated that a single accelerometer measures acceleration only in respect of a single degree of freedom. It may be that measuring the movement comprises operating a plurality of accelerometers (for example, three accelerometers). In such cases, the data may comprise multiple series of time samples (for example, one series for each of the plurality of accelerometers). Where measuring the movement comprises operating three or more accelerometers, it may be that those accelerometers are arranged to each measure orthogonal accelerations, such that the three accelerometers together record data fully representing translational movement of the complex weapon system in three-dimensional space.

Acquiring data may comprise receiving data via a communication link. Such a communication link may be hard-wired or wireless, and may be a direct communication link or one provided over a network (for example, the internet). For example, the method may be performed on a server remote from the complex weapon system. In such a case, acquiring the data may comprise receiving the data via the internet. In another example, the method may be performed by a processor forming part of a storage container for a missile. In such a case, acquiring the data may comprise receiving data from the missile via a direct communication link.

The movement of the complex weapon system results in mechanical loading of the complex weapon system. The acquired data can therefore be considered to characterise the mechanical loading of the complex weapon system as a result of the movement. It is possible to calculate, from the acquired data, a measure of the mechanical fatigue damage accrued by the complex weapon system during the movement.

Calculating the measure may comprise calculating a shock response spectrum (SRS). The shock response spectrum may comprise one or more of (for example, all of) a maximax SRS, a negative SRS, a positive SRS, a primary SRS, and a residual SRS. Thus, calculating the measure may comprise calculating a maximax SRS. The skilled person will appreciate that calculating a maximax SRS comprises taking the maximum absolute value of the response. The above-listed types of SRS and the methods by which they are calculated are well known to the skilled person and are described in standard ISO 18431-4. It may be that the above-listed types of SRS each characterise a different type of mechanical loading of the complex weapon system. Thus, it may be that calculating the measure comprises calculating multiple shock response spectra. It may be that the multiple shock response spectra include more than one of the above-listed types. It may be that the multiple shock response spectra are each a different one of the above-listed types.

Calculating the SRS may comprise operating a plurality of digital filters. The plurality of digital filters may comprise at least 20 filters, preferably at least 25 filters, more preferably at least 30 filters, yet more preferably at least 35 filters. It may be that each of the plurality of digital filters is configured to simulate a respective mass-damper-spring oscillator. It may be that calculating the SRS comprises simulating the application of an acceleration to the base of a mass-damper-spring oscillator and recording its response. It may be that the applied acceleration is determined on the basis of the acquired data (and thereby of the movement of the complex weapon system). Calculating the SRS may comprise recording the maximum responses of each of the plurality of simulated mass-damper-spring oscillators to the applied acceleration. Thus, it may be that each of the plurality of digital filters is configured to calculate the maximum response to an input acceleration of a respective simulated mass-damper-spring oscillator.

Calculating the measure may comprise calculating a fatigue damage spectrum (FDS). Calculating the FDS may comprise calculating, from the acquired data, a stress spectrum on the complex weapon system due to the movement of the complex weapon system. Calculating the FDS may further comprise operating a rainflow-counting algorithm, for example on individual frequency components of the calculated stress spectrum. Calculating the FDS may comprise identifying points within the calculated SRS where the rate of change of the response equals zero (i.e. an inflexion point). Calculating the FDS may comprise calculating the displacement between two consecutive such points. Calculating the FDS may comprise calculating, for each pair of consecutive inflexion points, a respective displacement between the two inflexion points in the pair. In such cases, calculating the FDS may comprise summing each of the calculated displacements. Calculating the FDS may comprise performing a Wöhler calculation (for example, based on the sum of the calculated displacement).

The method may comprise calculating a plurality of measures (for example, including one or more SRS and an FDS).

In order to track the total mechanical fatigue damage accrued by the complex weapon system, the method comprises updating, based on the calculated measure, a cumulative total of the mechanical fatigue damage accrued by the complex weapon system to reflect the movement of the complex weapon system.

It will be appreciated that, just as the calculated measure may comprise a spectrum, the cumulative total may also comprise a spectrum or a series of data points. Similarly, where the method comprises calculating multiple measures, the method may also comprise updating multiple cumulative totals (for example, corresponding to the multiple calculated measures).

Updating the cumulative total may comprise adding the calculated measure to the cumulative total (for example, where the calculated measure comprises an FDS). Updating the cumulative total may comprise taking the maximum of the calculated measure and the cumulative total. Where the calculated measure and cumulative total each comprise a spectrum (for example, an SRS), updating the cumulative total may comprise, for each of the data points in the spectra (for example, for each frequency component), taking the maximum value of that particular data point. Thus, for an SRS, updating the cumulative total may comprise calculating an envelope of the cumulative total and the calculated measure.

The method may further comprise initialising the cumulative total, for example in response to the acquisition of a first data set representing a movement of the complex weapon system. Initialising the cumulative total may comprise setting the cumulative total to be equal to the first calculated measure.

The method may further comprise repeating the acquiring, calculating, and updating steps in respect of a further movement of the complex weapon system. It may be that the acquiring, calculating, and updating steps are repeated multiple times over the course of a deployment of the complex weapon system. It may be that the acquiring is repeated at least every 250 samples, preferably at least every 50 samples, more preferably at least every 10 samples. It may be that the calculating is repeated at least every 250 samples, preferably at least every 50 samples, more preferably at least every 10 samples. It may be that the updating is repeated at least every 250 samples, preferably at least every 50 samples, more preferably at least every 10 samples. It may be that one or more of acquiring, calculating, and updating steps are repeated for each sample in the series of time samples. It may be that that the calculating and updating steps are repeated periodically (for example, at regular intervals). It will be appreciated that such intervals may be defined in terms of a time interval or in terms of a number of samples. It may be that the acquiring is repeated at least every 5 seconds, preferably at least every 500 ms, more preferably at least every 100 ms. It may be that the calculating is repeated at least every 5 seconds, preferably at least every 500 ms, more preferably at least every 100 ms. It may be that the updating is repeated at least every 5 seconds, preferably at least every 500 ms, more preferably at least every 100 ms. Thus, it may be that the acquiring, calculating, and updating steps are repeated continuously. By regularly repeating the acquiring, calculating, and updating steps, it is possible to maintain a rolling cumulative total of the mechanical fatigue accrued by the complex weapon system.

It will be appreciated that a complex weapon system may be deployed for hours at a time. The time over which the complex weapon system is moving can be conceptually divided into a plurality of time periods. These time periods may be individually processed according to the method of the present invention. Thus, it may be that the method further comprises a step of acquiring further data defining a further movement of the complex weapon system. It may be that the movement and the further movement each correspond to distinct ones of the plurality of time periods. For example, it may be that the movement and the further movement are associated with consecutive time periods, such that the further movement immediately follows on from the movement. The method may further comprise, on the basis of the acquired further data, calculating a further measure of mechanical fatigue damage to the complex weapon system arising from the further movement. The method may comprise, on the basis of the calculated further measure, updating the cumulative total to account for the mechanical fatigue damage arising from the further movement. Thus, the cumulative total is updated to reflect the fatigue damage arising from both the movement and the further movement. The skilled person will appreciate that, by repeating this process over the course of a deployment of the complex weapon system, the cumulative total will be maintained in a state that represents the quantity of fatigue damage currently accrued by the complex weapon system.

The method may further comprise, subsequent to the updating, discarding the acquired data. It may be that, after each update of the cumulative total, the data associated with that update to the cumulative total is discarded. It will be appreciated that, once the cumulative total has been updated, the mechanical fatigue damage arising from the movement is reflected in the cumulative total. Discarding the acquired data reduces the quantities of data which must be stored in order to monitor the mechanical fatigue damage accrued by the complex weapon system. By repeating the steps frequently, the need to store large quantities of data defining movements of the complex weapon system is reduced.

The method may comprise comparing the cumulative total to a predetermined threshold. It may be that the predetermined threshold represents an associated benchmark of fatigue damage (for example, associated with the certified service life of the complex weapon system). The method may also comprise determining, on the basis of the comparison, an expected remaining life of the complex weapon system. The method may further comprise, in response to the cumulative total exceeding the predetermined threshold, generating a notification that the complex weapon system has accrued a corresponding level of mechanical fatigue damage. It may be that the predetermined threshold corresponds to a quantity of mechanical fatigue damage for which the complex weapon system is certified. Thus, the notification may indicate that the complex weapon has reached the end of its certified life. Alternatively, or additionally, the method may further comprise generating a notification that the complex weapon system is approaching the end of its life (for example, having reached 80% of its certified mechanical fatigue damage). Generating a notification may comprise creating a visible or audible alert (for example, by lighting an LED or by periodically issuing a sound). Alternatively or additionally, generating a notification may comprise transmitting a signal to a munitions management system.

The method may comprise uploading the cumulative total to a database for monitoring by the operator of the complex weapon system. It will be appreciated that such a step of uploading the cumulative total need not necessarily be performed every time the cumulative total is updated. It may be that the uploading is performed periodically (for example, daily). It may be that the uploading is performed in response to the end of a deployment of the complex weapon system (for example, in response to the complex weapon system being returned to its storage container). The database may be remote from the complex weapon system (for example, on a remote server). The uploading may therefore comprise transmitting the cumulative total to a computing system providing the database. Such a transmission may be performed via a network (for example, the internet). In such cases, it may be that the transmission is encrypted.

The method may comprise identifying the predetermined threshold by subjecting an instance of the complex weapon system to an accelerated aging programme. It may be that the instance of the complex weapon system which is subjected to the accelerated again programme (that instance henceforth referred to as "the certification system") is also configured to perform the method of the present invention. By performing the method of the present invention on the certification system, it is possible to more accurately determine the certified service life of the complex weapon system in terms of mechanical fatigue damage.

The second aspect of the present invention provides a computer program. The computer program comprises a set of instructions which, when executed by a computerised device, cause the computerised device to perform a method of monitoring mechanical fatigue of a complex weapon system. The method comprises acquiring data representing a movement of the complex weapon system. The method also comprises, on the basis of the acquired data, calculating a measure of mechanical fatigue damage to the complex weapon system arising from the movement. The method further comprises, on the basis of the calculated measure, updating a cumulative total of the mechanical fatigue damage accrued by the complex weapon system to account for the mechanical fatigue damage arising from the movement.

Thus, it may be that the set of instructions, when executed by a computerised device, cause the computerised device to perform a method of monitoring mechanical fatigue of a complex weapon system according to the first aspect.

The computerised device may comprise one or more of: a computer, a server, a processing node, a field programmable gate array (FPGA), a programmable logic device (PLD), or a processor. It will be appreciated that the computerised device may be physically distributed, such that the computerised device is not embodied in a single machine or location. In such cases, the disparate parts of the computerised device.

The third aspect of the present invention provides a system for monitoring fatigue damage to a complex weapon system. The system comprises a data acquisition module and a fatigue damage monitor. The data acquisition module is configured to acquire data representing a movement of the complex weapon system. The fatigue damage monitor is configured to calculate, on the basis of the acquired data, a measure of mechanical fatigue damage to the complex weapon system arising from the movement and to update, on the basis of the calculated measure, a cumulative total of the mechanical fatigue damage accrued by the complex weapon system to account for the mechanical fatigue damage arising from the movement.

Where calculating the measure comprises operating a plurality of digital filters, the fatigue damage monitor may be configured to process two or more of the digital filters (for example, all of the digital filters) in parallel. It may be that the system comprises an FPGA. It may be that one or both of the data acquisition module and the fatigue damage monitor are implemented at least in part by the FPGA. Implementing the system using an FPGA allows increased parallelisation, which can enable the measure to be calculated and the cumulative total updated sufficiently quickly as to not lead to backlogs in the processing of acquired data. Alternatively or additionally, the system may comprise a processor. It may be that one or both of the data acquisition module and the fatigue damage monitor are implemented at least in part by the processor.

The fourth aspect of the present invention provides a complex weapon system comprising a system according to the third aspect.

FIG. 1 shows a functional block diagram of a complex weapon system 100 according to a first embodiment of the invention.

The complex weapon system 100 comprises a data acquisition module 101. The data acquisition module 101 is configured to acquire data representing movement of the complex weapon system 100. In this example embodiment, the data acquisition system 101 comprises an inertial measurement unit (IMU) 103. The IMU 103 comprises a plurality of accelerometers (in this particular example, three accelerometers) and thus is configured to measure movement of the complex weapon system 100. In this example embodiment, the accelerometers are arranged such that they each measure acceleration in a direction orthogonal to that measured by the other two of the accelerometers. Thus, the IMU 103 is configured to measure translational acceleration of the complex weapon system in all three planes of motion. The IMU 103 is therefore configured to generate movement data 105 representing motion of the complex weapon system 100. In this example, the movement data 105 comprises three series of time samples of acceleration (one series from each of the three accelerometers).

In other embodiments of the invention, the IMU 103 may be separate from the data acquisition module 101, in which case the data acquisition module 101 may be configured to receive the data 105 from the IMU 103.

The complex weapon system 100 further comprises a fatigue damage monitor 107. The fatigue damage monitor 107 is configured to receive the movement data 105 from the IMU 103 into a fatigue damage calculator 109. The fatigue damage calculator 109 is configured to calculate, on the basis of the movement data 105, one or more measures 111 of mechanical fatigue damage to the complex weapon system 100 arising from the movement.

In this example embodiment, the fatigue damage monitor 107 is configured to calculate an SRS and an FDS. Calculating an SRS comprises evaluating the output of a transfer function for a single degree of freedom mass-damper-spring oscillator system. The transfer function for such a system is as follows:

$$G(s) = \frac{a_2(s)}{a_1(s)} = \frac{cs + k}{ms^2 + cs + k}$$

Where:
a₁=Acceleration applied to the base the oscillator
a₂=Acceleration in response
m=Mass
c=Damping constant
k=Spring constant
s=Laplace variable (complex frequency) in radians per second The single degree of freedom system is characterised by its undamped natural frequency and the resonance gain, as shown below:

$$f_n = \frac{1}{2\pi}\sqrt{\frac{k}{m}}$$

$$Q = \frac{\sqrt{km}}{c}$$

Where:
$f_n$=Natural frequency in Hz
Q=Resonance gain (Q-factor)
Thus, the transfer function can be rewritten as follows:

$$G(s) = \frac{a_2(s)}{a_1(s)} = \frac{\frac{\omega_n s}{Q} + \omega_n^2}{s^2 + \frac{\omega_n s}{Q} + \omega_n^2}$$

Where:
$\omega_n = 2\pi f_n$=Natural frequency in radians/s
The SRS is calculated by applying the measured acceleration (i.e. that represented by the data 105) to the base of a set of simulated single degree of freedom mass-damper-spring oscillators, each having a different natural frequency.

The maximum responses of the oscillators as a function of their natural frequencies together form the SRS.

In this example, 27 oscillators are used in the calculation of the SRS. However, it will be appreciated that, in other embodiments of the invention, other numbers of oscillators may be also be used.

Figure 4:
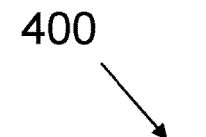
FIG. 4 shows a functional block diagram of a digital implementation of the SRS calculation.
Figure 4:
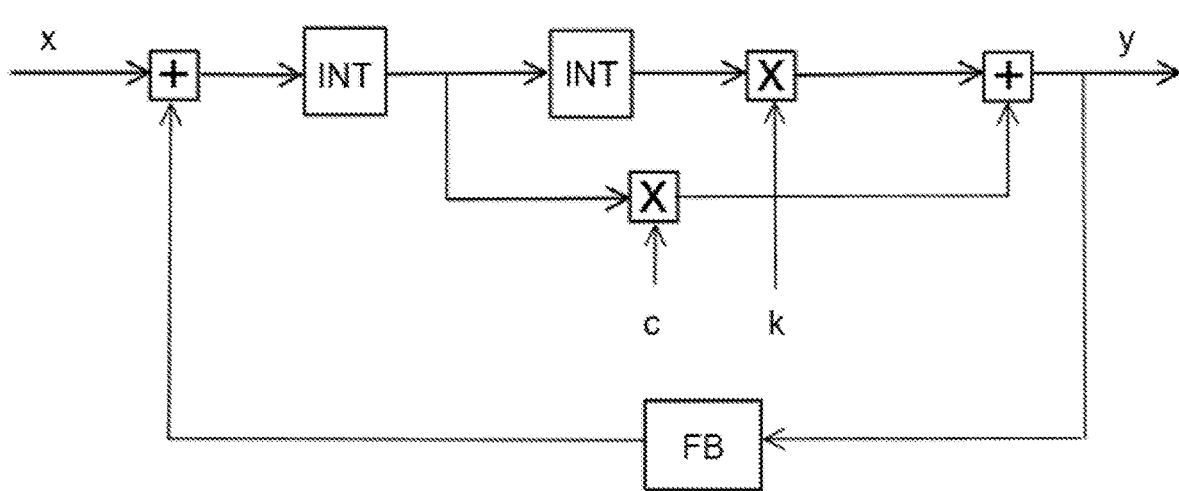

FIG. 4 shows a functional block diagram of a digital implementation of the SRS calculation. It will be appreciated by the skilled person that the functional block diagram implements the transfer function above.

In the illustrated implementation, the discrete-time integrator block used in the design is a Forward-Euler variant. The difference equation of the discrete-time integrator block is:

$$y(n)=y(n-1)+\Delta t \cdot x(n-1)$$

Where:

$\Delta t$=the sampling period

Taking the z-transform of both sides of the difference equation yields the following transfer function for the discrete-time integrator:

$$Y(z) = Y(z)z^{-1} + \Delta t. \ X(z)z^{-1}$$

$$Y(z)(1 - z^{-1}) = \Delta t. \ X(z)z^{-1}$$

$$ID(z) = \frac{Y(z)}{X(z)} = \Delta t. \ z^{-1}/(1 - z^{-1}) = \Delta t/(z - 1)$$

Use of the transfer function above to implement discrete-time integrators for the SRS calculation can provide an improved discrete-time implementation of the SRS calculation.

Calculating the FDS comprises performing rainflow cycle counting for the responses of each of the digital filters. In this case, calculating the FDS comprises identifying points within each of the 27 filters' displacement responses at which the rate of change equals zero (i.e. points of inflexion in the response), and summing the displacement between those points. Calculating the FDS further comprises performing a Wöhler calculation (otherwise known as an "S-N" calculation) based on the summed displacements. Thus, the FDS can be calculated and updated in real-time, without the need to retain a full time-history of acceleration data.

In this case, the value of the spring constant is chosen arbitrarily. As a result, the calculated SRS and FDS do not indicate absolute real-world metrics of the mechanical fatigue damage accrued by the complex weapon system. However, as long as the value of the constant is not varied, the calculated SRS and FDS still provide information on the mechanical fatigue damage accrued by the complex weapon system 100 relative to that accrued at other times or by other instances of the complex weapon system 100 (including, for example, an instance of complex weapon system 100 used to certify the complex weapon system). Thus, in this case, the SRS and FDS provide comparative measures of the fatigue damage to the complex weapon system 100. It will be appreciated that other embodiments of the invention may utilise material-specific constants in order to attempt to quantify the mechanical fatigue damage in absolute terms.

The process for calculating an SRS is well known in the art and is described in detail in standard ISO 18431-4. Similarly, the process for calculating an FDS is well known in the art and is described in detail in standard STANAG AECTP-240 Leaflet 2410/1 Annex E.

Returning to FIG. 1, the complex weapon system 100 further comprises a cumulative total calculator 113. The cumulative total calculator 113 is configured to process the measures 111 received from the fatigue damage calculator 109 to maintain a running total of the mechanical fatigue damage accrued by the complex weapon system 100. In this example, the cumulative total calculator 113 is configured to maintain two cumulative totals (one corresponding to SRS and one corresponding to FDS). It will be appreciated that, in other embodiments of the invention, the cumulative total calculator 113 may be configured to maintain other numbers of cumulative totals (for example, where fatigue damage calculator 109 is configured to calculate other numbers of measures 111).

The cumulative total calculator 113 is configured to receive the calculated measure 111 from fatigue damage calculator 109. The cumulative total calculator 113 is further configured to, in response to the receipt of the first set of measures 111, initialise cumulative totals of fatigue damage by setting the cumulative totals to be equal to the corresponding received measures 111. Thus, the cumulative total for SRS is set to the received SRS and the cumulative total for FDS is set to the received FDS. The fatigue damage calculator 109 is further configured to, in response to receipt of subsequent calculated measures, update the cumulative totals 115. The updating is performed on the basis of the received calculated measures 111, such that the cumulative totals are updated to reflect the mechanical fatigue damage arising from the movement associated with those calculated measures 111. It will be appreciated that, as SRS and FDS each comprise a spectrum, the corresponding cumulative totals will also each comprise a spectrum. Thus, the cumulative totals comprise a cumulative SRS and a cumulative FDS.

Updating the cumulative SRS comprises taking the maximum value of each data point in the spectra from the current cumulative SRS and the received SRS. Thus, updating the cumulative SRS comprises calculating an envelope of the current cumulative SRS and the received SRS. Updating the cumulative FDS comprises adding the current cumulative FDS to the FDS received from the fatigue damage calculator 109. Thus, the fatigue damage monitor 107 is configured to update the cumulative totals 115 based on (for example, based only on) the cumulative totals 115 and the calculated measures 111.

The fatigue damage monitor 107 is further configured to, in response to the completion of the updating, discard the acquired data associated with that update to the cumulative totals 115.

The fatigue damage monitor 107 is configured to process further sets of data (and thus can be said to process further movements of the complex weapon system 100) throughout a deployment of the complex weapon system 100. Thus, the fatigue damage monitor 107 is configured to repeat the acquiring, calculating, updating, and discarding in respect of further movements of the complex weapon system.

The complex weapon system 100 further comprises a notification module 117. The notification module 117 is configured to receive the cumulative totals 115 and to compare each of them to a corresponding predetermined threshold. The predetermined thresholds each correspond to a quantity of mechanical fatigue damage for which the complex weapon system is certified. In this example case, each of the predetermined thresholds comprises a spectrum. Specifically, the predetermined threshold for the SRS measure comprises an SRS and the predetermined threshold for the FDS measure comprises an FDS.

In this case, the predetermined thresholds were identified by subjecting an instance of the complex weapon system 100 (the certification system) to an accelerated aging pro-gramme. To calculate the predetermined thresholds, the certification system is subjected to the maximum shock and vibration environment to which the system is expected to be exposed during its intended service life. The certification system performs the method of the present invention, as described above, throughout the aging programme, thus calculating values for the cumulative totals which corre-spond to the fatigue damage accrued by the complex weapon system during the accelerated aging programme (which is designed to represent a full service life of the complex weapon system 100). These calculated values are copied to operational instances of the complex weapon system 100 to serve as the predetermined thresholds.

The notification module 117 is further configured to determine, on the basis of the comparison, an expected remaining life of the complex weapon system 100. This determination is performed by calculating, for each of the data points in the spectra, the cumulative total as a percent-age of the predetermined threshold. The maximum of these percentages is taken as an estimate of the percentage of the certified life of the complex weapon system 100 that has been expended. It will be appreciated that other embodi-ments of the invention may utilise one or more other methods to determine the expected remaining life of the complex weapon system 100 (for example, using an average of the percentages, rather than the maximum).

The notification module 117 is further configured to generate, in response to the cumulative total exceeding the predetermined threshold, a notification that the complex weapon system has accrued an associated level of mechani-cal fatigue damage (for example, the maximum level of mechanical fatigue damage for which the complex weapon system 100 is certified). In this case, the notification module 117 is configured to generate the notification by transmitting a signal to the operator's munitions management system. It will be appreciated that other embodiments of the invention may employ other means to generate the notification (for example, sounding an audible alert or lighting an LED). The notification module 117 is also, in this case, configured to regularly transmit the cumulative totals 115 to the munitions management system for the purpose of assisting the operator of the complex weapon system 100 in performing munitions inventory management.

The complex weapon system 100 further comprises a processor 119 and an associated memory 121. The processor 119, in this example, comprises a field programmable gate array (FPGA). In embodiments of the invention, the pro-cessor may be configured to implement some or all of the functions of the data acquisition module 101, the fatigue damage monitor 109, and the notification module 117. The memory 121 may be configured to store a set of instructions, executable by the processor 119 to enable it to implement those functions.

In operation, the data acquisition module 101 operates the IMU 103 to acquire data 105 representing a movement of the complex weapon system occurring over a period of time. The data 105, which comprises three time series of accel-eration covering the period of time, is passed to the fatigue damage calculator 109. The fatigue damage calculator 109 calculates, from the data 105, measures 111 of the mechani-cal fatigue damage accrued by the complex weapon system 100 associated with the movement. The measures 111, comprising an SRS and an FDS, are passed to the cumula-tive total calculator 113. The cumulative total calculator maintains cumulative totals 115 of the mechanical fatigue damage that has thus far accrued by the complex weapon system 100. Thus, immediately prior to receiving the mea-sures 111, the cumulative totals 113 represent the total mechanical fatigue damage accrued by the complex weapon system 100 up to the beginning of the period of time. In response to receipt of the measures 111, the cumulative total calculator updates the cumulative totals 115 based on the measures 111. Thus, the updated cumulative totals 115 include the mechanical fatigue damage accrued by the complex weapon system during the period of time, and thus represent the total mechanical fatigue damage accrued by the complex weapon system 100 up to the end of the period of time. Providing that the complex weapon system is still deployed at the end of the period of time, the process is then repeated in respect of a further movement occurring over a further period of time starting immediately upon the end of the preceding period. This process continually repeats whilst the complex weapon system is deployed, maintaining the cumulative totals 115 in a state reflective of the total mechanical fatigue damage accrued by the complex weapon system 100. After each update, the cumulative totals 115 are compared by the notification module 117 to corresponding predetermined thresholds. The predetermined thresholds represent the maximum certified life of the complex weapon system, the values of the predetermined thresholds having been determined through an accelerated aging programme. Upon one or more of the cumulative totals reaching or exceeding its associated predetermined threshold, the noti-fication module 117 generates a notification, in the form of a signal 123 to a munitions management system of the operator of the complex weapon system 100 indicating that the complex weapon system 100 has reached the end of its certified life.

Figure 2:
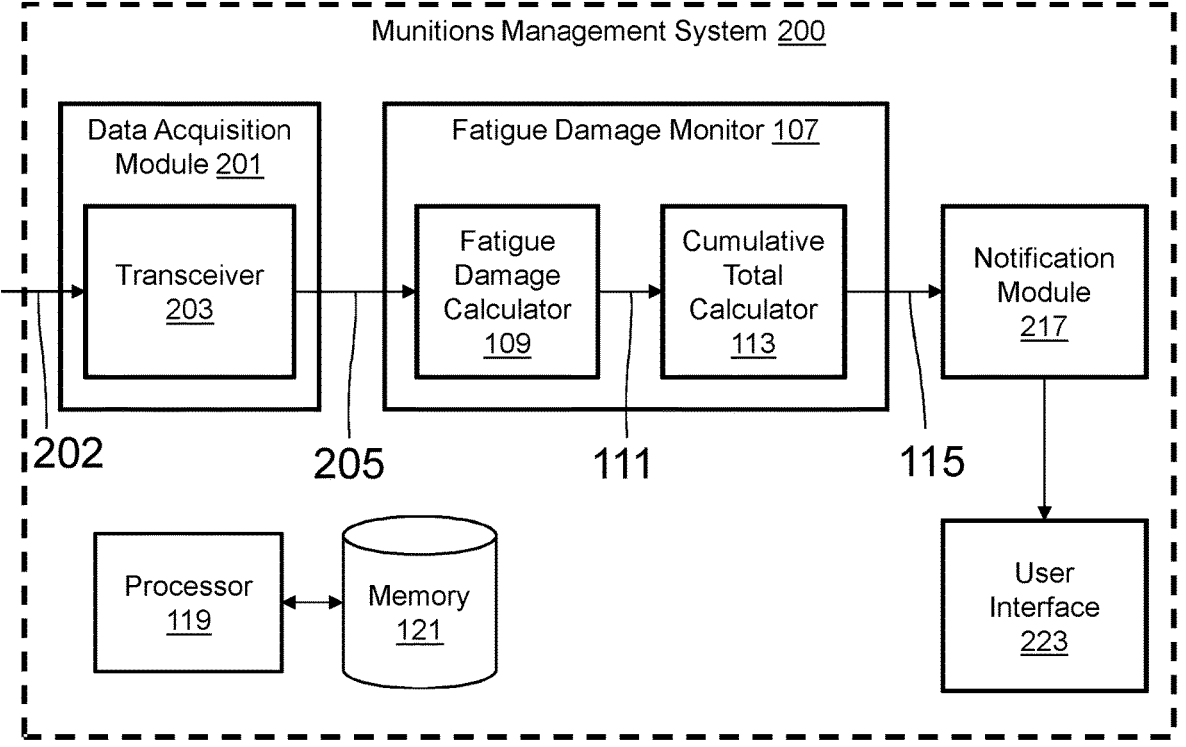
FIG. 2 shows a functional block diagram of a munitions management system according to a second embodiment of the invention.

FIG. 2 shows a functional block diagram of a munitions management system 200 according to a second embodiment of the invention. The same reference numerals as used in FIG. 1 are used in FIG. 2 to refer to like elements.

The munitions management system 200 operates, in this case, on a computing resource remote from the complex weapon systems to be monitored. The munitions manage-ment system 200 is configured to monitor the mechanical fatigue damage accrued by a number of complex weapon systems. Thus, the munitions management system 200 is configured to perform the below-described functions in respect of multiple different complex weapon systems. Those multiple complex weapon systems need not neces-sarily be all of the same type.

The munitions management system 200 comprises a data acquisition module 201. The data acquisition module 201 functions substantially as described in respect of the first embodiment except that, rather than operating an IMU to measure acceleration data of a complex weapon system, the data acquisition module 201 is configured to operate a transceiver 203 to receive a signal 202 from a complex weapon system. The signal 202 may be transmitted over one or more wireless or wired communication links and may pass over one or more networks including, for example, the internet. The signal 202 contains data 205 representing a movement of the complex weapon system. As complex weapon systems will not be in constant communication with the munitions management system 200, it may be that one or more of the complex weapon systems is configured to record acceleration data covering an entire deployment of the complex weapon system. Thus, the signal 202 may contain data 205 covering an entire deployment of the complex weapon system.

The remainder of the munitions management system 200 functions in the same way as is described above in respect of the corresponding portion of the complex weapon system 100 of the first embodiment, but for the notification module 217. The notification module 217 is, in this embodiment, not configured to transmit a signal to another munitions management system, but instead is configured to generate a notification on a user interface 223 associated with the munitions management system 200.

It will be appreciated that the munitions management system 200, or the computing resource providing the munitions management system 200, may also be configured to perform other functions (for example, munitions inventory management).

According to a third embodiment of the invention, there is provided a missile storage container. The missile storage container comprises a computing resource which functions substantially as described in respect of the second embodiment, except for the notification module, which instead functions substantially as described in respect of the first embodiment.

Figure 3:
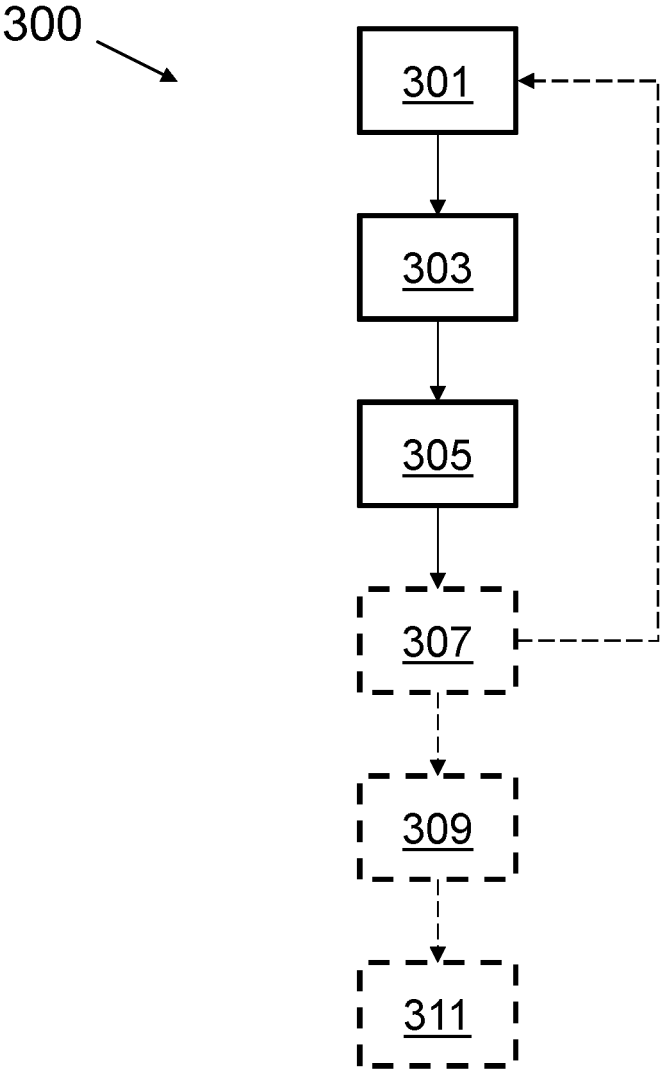
FIG. 3 shows a flow chart illustrating the steps of a method according to a fourth embodiment of the invention.

FIG. 3 shows a flow chart illustrating the steps of a method 300 of monitoring mechanical fatigue of a complex weapon system according to a fourth embodiment of the invention.

A first step of the method 300, represented by item 301, comprises acquiring data representing a movement of the complex weapon system. It may be that acquiring the data comprises measuring a movement of the complex weapon system. In such cases, it may be that measuring a movement of the complex weapon system comprises operating an accelerometer to determine an acceleration of the complex weapon system.

A second step of the method 300, represented by item 303, comprises, on the basis of the acquired data, calculating a measure of mechanical fatigue damage to the complex weapon system arising from the movement. It may be that calculating the measure comprises calculating a shock response spectrum. Alternatively or additionally, it may be that calculating the measure comprises a calculating a fatigue damage spectrum.

A third step of the method 300, represented by item 305, comprises, on the basis of the calculated measure, updating a cumulative total of the mechanical fatigue damage accrued by the complex weapon system to account for the mechanical fatigue damage arising from the movement. It may be that updating the cumulative total comprises adding the calculated measure to the cumulative total. It may be that updating the cumulative total comprises taking a maximum of the cumulative total and the calculated measure. It may be that the updating is based only on the cumulative total and the calculated measure.

An optional fourth step of the method 300, represented by item 307, comprises, subsequent to the updating, discarding the acquired data.

An optional fifth step of the method 300, represented by item 309, comprises comparing the cumulative total to a predetermined threshold and, on the basis of the comparison, determining an expected remaining life of the complex weapon system.

An optional sixth step of the method 300, represented by item 311, comprises, in response to the cumulative total exceeding the predetermined threshold, generating a notification that the complex weapon system has accrued an associated level of mechanical fatigue damage. It may be that the predetermined threshold corresponds to a quantity of mechanical fatigue damage for which the complex weapon system is certified. The method 300 may further comprise a step (for example, occurring prior to the first step 301 of the method) of identifying the predetermined threshold by subjecting an instance of the complex weapon system to an accelerated aging programme.

It may be that the method comprises repeating the acquiring (step 301), calculating (step 303), and updating (step 305) steps in respect of a further movement of the complex weapon system. It may be that the acquiring, calculating, and updating steps are repeated multiple times of the course of a deployment of the complex weapon system. In such cases, it may be that the optional discarding step (step 307) is also repeated. It may be that the acquiring, calculating, and updating steps are repeated at least every 5 seconds, preferably at least every 500 ms, yet more preferably at least every 100 ms.

While the present invention has been described and illustrated with reference to particular embodiments, it will be appreciated by those of ordinary skill in the art that the invention lends itself to many different variations not specifically illustrated herein. By way of example only, certain possible variations will now be described.

It will be appreciated from the described embodiments that the measurement of the movement of the complex weapon system and the calculation of the measures of fatigue damage need not necessarily be performed by the same subsystem or in the same location. In particular, whilst the measurement of movement of a complex weapon system must be performed on the complex weapon system, the resulting data may be transmitted to a remote computing resource for processing. That computing resource may then perform subsequent steps in the method of the present invention.

While the first embodiment has been described in relation to a complex weapon system as a whole, it will be appreciated that all of the described functionality may be implemented in a single subsystem of that complex weapon system. Thus, the present invention also provides a missile subsystem for monitoring mechanical fatigue of a complex weapon system.

While, the described embodiments calculate a single SRS and a single FDS, it will be appreciated that other measures of fatigue damage (and combinations thereof) may also be used. For example, embodiments of the invention may calculate only an SRS, or only an FDS. Similarly, whilst the described embodiments are described simply as calculating an SRS, it will be appreciated that embodiments of the present invention may calculate multiple SRS of different types. Such SRS may comprise one or more of (for example, all of) a maximax SRS, a negative SRS, a positive SRS, a primary SRS, and a residual SRS.

It will be appreciated that the complex weapon system 100, the munitions management system 200, and the missile storage container described above may each comprise one or more processors and/or memory. Thus the complex weapon system 100 may comprise a processor 119 and associated memory 121. The processor 119 and the associated memory 121 may be configured to perform one or more of the above-described functions of the complex weapon system 100. Similarly, the munitions management system 200 may comprise a processor 219 and associated memory 221. The processor 219 and the associated memory 221 may be configured to perform one or more of the above-described functions of the munitions management system 200. Each device, module, component, machine or function as described in relation to any of the examples described herein (for example, data acquisition module 101, fatigue damage monitor 107, or notification module 117) may similarly comprise a processor or may be comprised in apparatus comprising a processor. One or more aspects of the embodiments described herein comprise processes performed by apparatus. In some examples, the apparatus comprises one or more processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also include computer programs, particularly computer programs on or in a carrier, adapted for putting the above-described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The one or more processors of the complex weapon system 100, the munitions management system 200, and the missile storage container may comprise a central processing unit (CPU). The one or more processors may comprise a graphics processing unit (GPU). The one or more processors may comprise one or more of a field programmable gate array (FPGA), a programmable logic device (PLD), or a complex programmable logic device (CPLD). The one or more processors may comprise an application specific integrated circuit (ASIC). It will be appreciated by the skilled person that many other types of device, in addition to the examples provided, may be used to provide the one or more processors. The one or more processors may comprise multiple co-located processors or multiple disparately located processors. Operations performed by the one or more processors may be carried out by one or more of hardware, firmware, and software.

The one or more processors may comprise data storage. The data storage may comprise one or both of volatile and non-volatile memory. The data storage may comprise one or more of random access memory (RAM), read-only memory (ROM), a magnetic or optical disk and disk drive, or a solid-state drive (SSD). It will be appreciated by the skilled person that many other types of memory, in addition to the examples provided, may also be used. It will be appreciated by a person skilled in the art that the one or more processors may each comprise more, fewer and/or different components from those described.

The techniques described herein may be implemented in software or hardware, or may be implemented using a combination of software and hardware. They may include configuring an apparatus to carry out and/or support any or all of techniques described herein. Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. The carrier may comprise a computer readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips.

The present disclosure also provides method of monitoring mechanical fatigue of a system, the method comprising:

acquiring data representing a movement of the system;

on the basis of the acquired data, calculating a measure of mechanical fatigue damage to the system arising from the movement;

on the basis of the calculated measure, updating a cumulative total of the mechanical fatigue damage accrued by the system to account for the mechanical fatigue damage arising from the movement.

The system may comprise an aircraft (for example, a drone or a manned aircraft), a ground vehicle (for example, a wheeled or tracked vehicle), a ship, a submarine, a train, or a non complex weapon system (for example, an unguided rocket or bomb).

It will be appreciated by the skilled person that any or all of the features described above in relation to a complex weapon system are also applicable to the disclosed system.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of monitoring mechanical fatigue of a complex weapon system, the method comprising the steps of:

acquiring, by at least one accelerometer of an inertial measurement unit (IMU) mounted to the complex weapon system, data representing a movement of the complex weapon system, wherein the data comprises acceleration measurements captured at successive time intervals along a plurality of spatial axes;

on the basis of the acquired data, calculating, by a fatigue-damage calculator executed by a processor configured for hardware certification of the complex weapon system, a fatigue-damage spectrum characterizing cumulative mechanical strain experienced by the complex weapon system during the movement;

updating, on the basis of the calculated fatigue-damage spectrum, a cumulative total of mechanical fatigue damage accrued by the complex weapon system to account for the mechanical fatigue damage arising from the movement;

empirically calibrating certified fatigue-damage threshold value by subjecting a certification instance of the complex weapon system to a controlled accelerated-aging program that physically imposes multi-axis vibration and shock loads replicating maximum operational conditions expected during service life, the program comprising:

(a) mounting the certification instance on a vibration test fixture and operating the vibration test fixture to deliver controlled mechanical shocks and sustained vibration profiles representative of maximum operational loads, launch accelerations, and flight-induced dynamic conditions:

(b) acquiring, by accelerometers of the certification instance, the acceleration measurements during the controlled accelerated-aging program and computing corresponding fatigue-damage spectra and cumulative totals in real time to monitor fatigue-induced structural degradation and (c) establishing, from the degradation, the certified fatigue-damage threshold value corresponding to a cumulative total measured at a point of structural degradation or performance deviation of the certification instance, certified threshold being stored in memory and transferred to operational complex weapon systems for use during in-service monitoring:

comparing the cumulative total to the certified fatigue-damage threshold value, wherein the certified fatigue-damage threshold value corresponds to a quantity of the mechanical fatigue damage for which the complex weapon system is certified; and generating, by a notification module, a signal identifying that the complex weapon system has reached or exceeded an associated certified fatigue limit in response to the cumulative total exceeding the certified fatigue-damage threshold value.

2. The method according to claim 1, wherein calculating the fatigue-damage spectrum comprises calculating a shock response spectrum.

3. The method according to claim 1, wherein the updating the cumulative total comprises adding the calculated fatigue-damage spectrum to the cumulative total.

4. The method according to claim 1, further comprising, based on the comparison, determining an expected remaining life of the complex weapon system.

5. The method according to claim 1, further comprising repeating the acquiring, calculating, and updating steps in respect of a further movement of the complex weapon system.

6. The method according to claim 5, wherein the acquiring, calculating, and updating steps are repeated multiple times over the course of a deployment of the complex weapon system.

7. The method according to claim 5, wherein the acquiring, calculating, and updating steps are repeated at least every 5 seconds.

8. The method according to claim 1, wherein the updating is based only on the cumulative total and the fatigue-damage spectrum.

9. The method according to claim 1, further comprising, subsequent to the updating, discarding the acquired data.

10. A system for monitoring fatigue damage to a complex weapon system, the system comprising:

a data-acquisition module including at least one accelerometer of an inertial measurement unit (IMU) mounted to the complex weapon system and configured to acquire data representing movement of the complex weapon system, the data comprising acceleration measurements captured at successive time intervals along a plurality of spatial axes;

a fatigue-damage calculator executed by a processor configured for hardware certification of the complex weapon system and arranged to calculate, based on the acquired data, a fatigue-damage spectrum characterizing cumulative mechanical strain experienced by the complex weapon system during the movement;

a fatigue-damage accumulator configured to update, based on the calculated fatigue-damage spectrum, an in-situ cumulative total of mechanical fatigue damage accrued by the complex weapon system during active operation by filtering, integrating, and accumulating acceleration signals from the IMU to quantify strain energy imparted to the structure, such that the cumulative total represents a live measure of a mechanical fatigue state of the complex weapon system;

a certification module configured to empirically calibrate and certify a fatigue-damage threshold value by controlling a vibration-test fixture to subject a certification instance of the complex weapon system to a controlled accelerated-aging program that physically imposes multi-axis vibration and shock loads replicating maximum operational conditions expected during service life, the certification module being further configured to:

(a) operate the vibration-test fixture to deliver controlled mechanical shocks and sustained vibration profiles representative of maximum operational loads, launch accelerations, and flight-induced dynamic conditions;

(b) receive, from accelerometers of the certification instance, the acceleration measurements during the accelerated-aging program and compute corresponding fatigue-damage spectra and cumulative totals in real time to monitor fatigue-induced structural degradation; and (c) establish, from the monitored degradation, a certified fatigue-damage threshold value corresponding to a cumulative total measured at a point of structural degradation or performance deviation of the certification instance, the certified threshold being stored in memory and transferred to operational complex weapon systems for use during in-service monitoring;

a comparison module configured to compare the cumulative total to the certified fatigue-damage threshold value; and a notification module configured to generate a signal indicating that the complex weapon system has reached or exceeded the certified fatigue-damage threshold value.

11. The method according to claim 1, wherein the inertial measurement unit further comprises at least one gyroscope, and the method further comprises correcting the acceleration measurements for orientation changes of the complex weapon system based on angular-velocity data from the gyroscope.

12. The method according to claim 1, wherein calculating the fatigue-damage spectrum comprises filtering the acceleration measurements with a frequency-domain transfer function representative of a structural response characteristic of the complex weapon system.

13. The method according to claim 1, wherein the fatigue-damage calculator performs rain-flow cycle counting on the acceleration signals to determine cyclic loading contributing to the mechanical fatigue damage.

14. The method according to claim 1, further comprising verifying the structural degradation of the certification instance by non-destructive inspection selected from ultrasonic, radiographic, or thermographic testing.

15. The method according to claim 1, wherein the controlled accelerated-aging program is conducted under a temperature profile simulating in-service thermal extremes of the complex weapon system.

16. The method according to claim 1, further comprising transmitting the certified fatigue-damage threshold value and the cumulative total to a maintenance-management system configured to schedule inspection or component replacement.

17. The method according to claim 1, wherein the acquiring, calculating, and updating steps are performed continuously during operation of the complex weapon system to provide a real-time indication of accumulated mechanical fatigue damage.

18. The system according to claim 10, wherein the data-acquisition module further comprises an analog signal-conditioning circuit configured to low-pass filter accelerometer outputs prior to digitization.

19. The system according to claim 10, wherein the notification module is configured to transmit a maintenance alert to a mission-management terminal identifying a component of the complex weapon system associated with the fatigue-limit exceedance.

20. A certification apparatus for empirically establishing a fatigue-damage threshold for a complex weapon system, the apparatus comprising:

a vibration-test fixture configured to support a certification instance of the complex weapon system and apply controlled multi-axis vibration and shock loads replicating maximum operational conditions expected during service life;

a sensor suite mounted to the certification instance and comprising an inertial measurement unit (IMU) including a plurality of accelerometers and at least one gyroscope configured to measure linear and angular acceleration of the certification instance during the applied loads;

a calibration processor configured to:

(a) acquire, in real time, acceleration measurements from the sensor suite;

(b) filter and integrate the acceleration signals to compute mechanical strain energy imparted to the structure;

(c) accumulate the strain energy to determine cumulative mechanical fatigue damage; and (d) identify a certified fatigue-damage threshold value corresponding to a cumulative total measured at a point of structural degradation or performance deviation of the certification instance;

a validation module configured to confirm the structural degradation by at least one of visual inspection or non-destructive testing; and a data-storage interface configured to record the certified fatigue-damage threshold value together with associated test parameters in a non-transitory memory for transfer to operational complex weapon systems.

* * * * *